Figure 3:
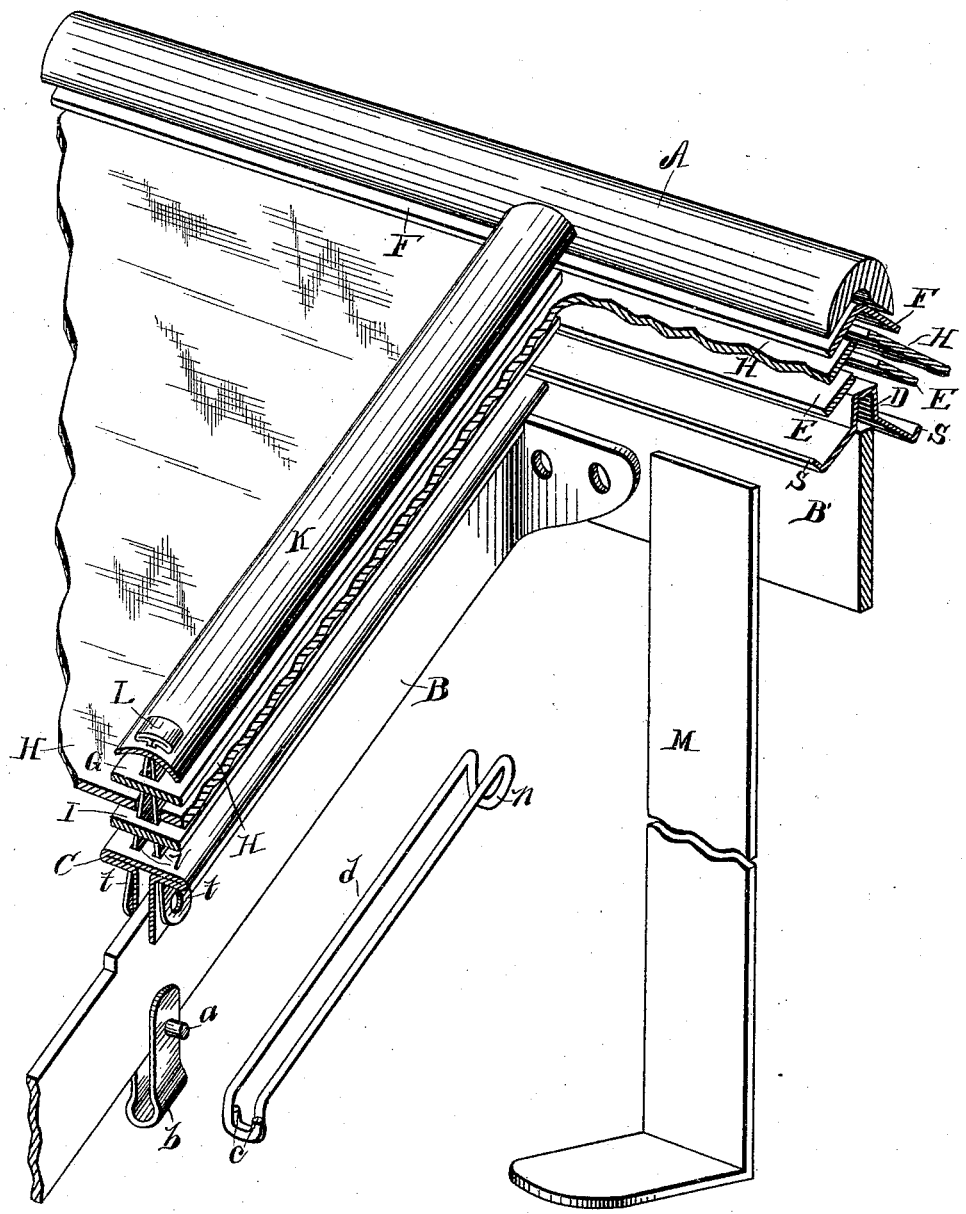

(No Model.)  2 Sheets—Sheet 1.
J. D. SCOVEL.
ROOF FOR HOT HOUSES.
No. 444,254. Patented Jan. 6, 1891.
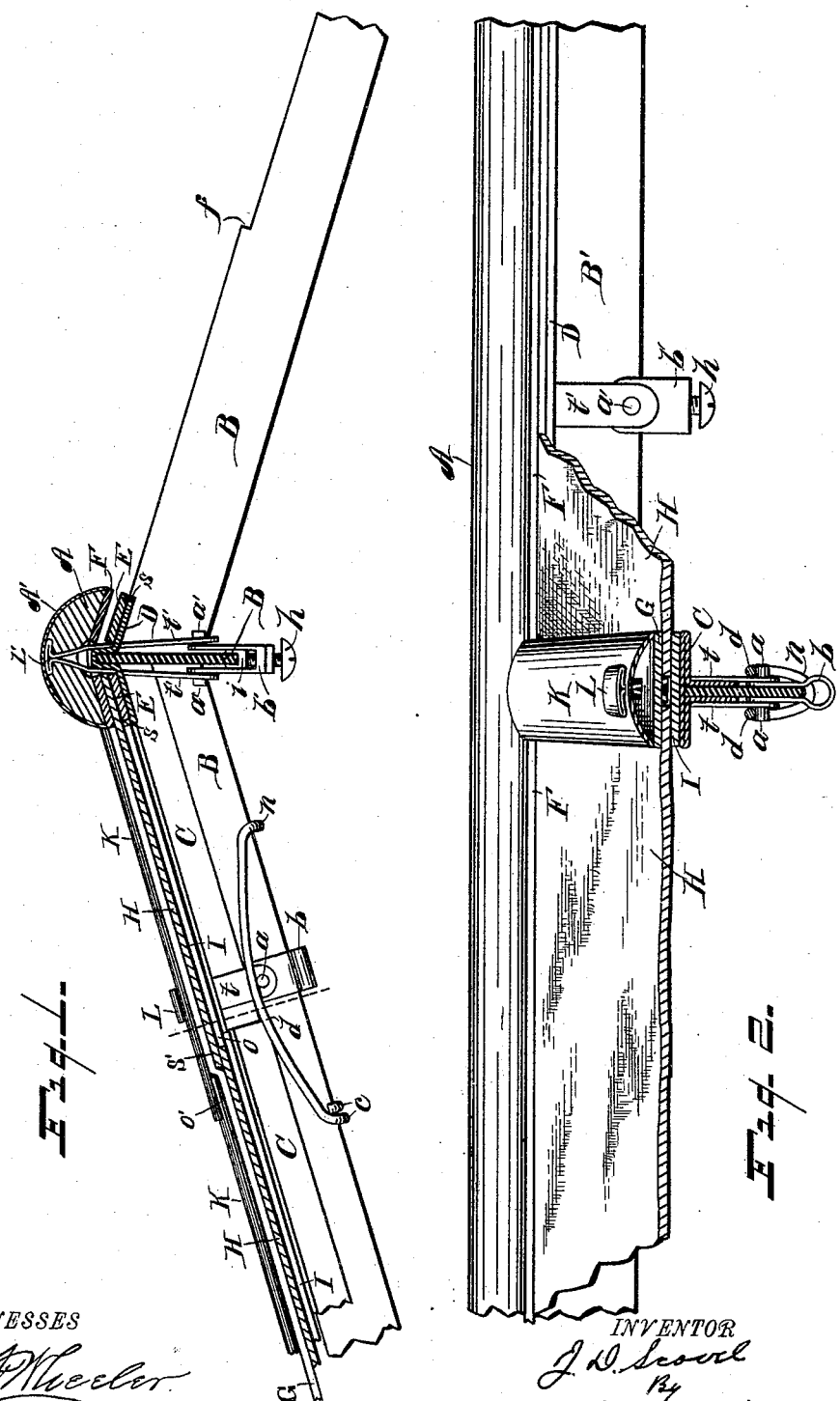
WITNESSES
INVENTOR
J. D. Scovel
By Roscoe B. Wheeler
Attorney.

(No Model.)   2 Sheets—Sheet 2.

J. D. SCOVEL.
ROOF FOR HOT HOUSES.

No. 444,254.   Patented Jan. 6, 1891.

WITNESSES

INVENTOR

UNITED STATES PATENT OFFICE.

JAMES D. SCOVEL, OF DETROIT, MICHIGAN.

ROOF FOR HOT-HOUSES.

SPECIFICATION forming part of Letters Patent No. 444,254, dated January 6, 1891.

Application filed April 28, 1890. Serial No. 349,848. (No model.)

*To all whom it may concern:*

Be it known that I, JAMES D. SCOVEL, a citizen of the United States, residing at Detroit, in the county of Wayne and State of Michigan, have invented certain new and useful Improvements in Roofs for Hot-Houses; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in the construction of roofs for hot-houses; and it consists in a certain combination and arrangement of parts whereby a roof is produced of great strength and one that is absolutely water-tight and throws but little shade; that provides for the contraction and expansion of the parts without danger of breaking the glass, and that permits of the removal and replacing of any of the panes of glass from the inside of the house without interfering with the other glass of the roof, all of which will be hereinafter more fully set forth, and the essential features of the device pointed out particularly in the claims.

In the accompanying drawings, forming a part of the specification, Figure 1 is an end view of a portion of my improved roof, partly in section. Fig. 2 is a side view of same, the parts shown in section being on dotted line of Fig. 1. Fig. 3 is a view of the parts of the roof drawn apart, showing the relative position thereof.

Referring to the letters of reference, A indicates the ridge-roll of the roof, B the rafters, and B' the purlin.

C and D indicate saddles adapted to fit over the rafters and purlin, respectively.

E E are strips of rubber or analogous packing that lie upon the inclined wings of the saddle D beneath the glass H. F is a like strip of packing lying upon the upper face of the glass H and between said glass and the ridge-roll A, as are also the strips G I, that lie between the saddle C and the glass H and between said glass and the metal cap K, respectively. L and L' are metal straps by means of which said parts are bound together, and M indicates a brace that may be employed for supporting the roof at the center.

The rafters B and purlin B' are made, preferably, of wrought-iron or steel, as the requisite strength may thereby be secured with but little bulk to obstruct the passage of light through the glass of the roof. The rafters are secured to the purlin on each side thereof and support the same. The purlin extends the entire length of the roof under the ridge, and is provided with the saddle D, that is adapted to fit snugly upon the upper edge thereof, said saddle having the inclined sides with the upwardly-turned flanges s at their lower edge, that retain in place the packing-strips E, that are placed upon the inclined sides of said saddle and which support the upper edge of the glass H. The packing-strip F is sufficiently wide to extend across the ridge of the roof and bear upon the upper face of the glass on each side thereof. The ridge-roll A is placed upon the packing-strip F, said roll being hollowed out on its under face to conform to the angle of the roof, and all of said parts are secured together by the metal tie-strap L', the head of which is anchored in the roll A and the ends t' t' of which pass downward through the strip F and the saddle D on each side of the purlin and receive in their lower ends the lugs or pins a' of the yoke b', said yoke having the set-screw h and sliding chair i. The under edge of the purlin rests in the chair i, and the set-screw h bears against the under face thereof, whereby by turning the screw h a downward tension is exerted on the strip L' sufficiently to draw the parts firmly together, forming a water-tight joint between the strips E F and the glass H, as clearly shown in Fig. 1.

The ridge-roll A is formed of wood, and is provided with a thin metallic covering A', (see Fig. 1,) which protects the wood from decay and prevents any leakage around the strap L' where it passes through said roll. The rafters B are set at such distance apart as to correspond with the size of the panes of glass used in the construction of the roof. Said rafters receive the saddles C on their upper edge, said saddles supporting on their upper face the packing-strips I, on which rest the adjacent edges of the panes of glass H, as shown in Fig. 2. The packing-strip G is placed between the upper face of said glass and the metal capping-strip K, as also shown in same figure, and all of said parts are bound together by means of the metal tie-strap L, the head of which engages with the upper face of the cap K and the arms *t t* thereof, passing downward through the packing-strips G and I and through the slots *v* in the saddle C, (see Fig. 3,) and, extending on each side of the rafter, receive the pins *a a* of the yoke *b* in the lower ends thereof, as shown in Fig. 2. Said pins *a* projecting through the arms *t t*, afford a bearing for the spring-lock *d*, which is employed to retain said parts in place. The loop end *n* of said lock is engaged under the lower edge of the rafter, the strands passing each side thereof and over the pins *a*. (See Fig. 2.) The hooked ends *c* of said lock are sprung down and hooked under the rafter, as clearly shown in Fig. 1, the tension of said lock holding the parts securely together and forming a tight joint between the glass and the packing-strips G I.

The rafters are provided with notches *f*, as shown at the right of Fig. 1, the depth of said notches corresponding with the thickness of the glass, so as to bring the lapping edges of the glass squarely together, as shown at *s'* in Fig. 1, the notches corresponding in number with the panes of glass in the roof between the ridge-roll and the eaves, each succeeding notch being slightly below the plane of the other. By this arrangement the lapped parts are permitted to retain the same angle as the plane of the roof and a tight joint secured between said parts.

It will be seen that the saddle C, packing-strip I, and metal cap K are employed for each row or series of the panes of glass forming the roof and secured by the tie-strap L and the spring-lock *d*, the ends of the packing-strip I overlying, as shown at *o*, and the ends of the capping-strip K overlying, as shown at *o'*; but the outer packing-strip G is continuous from the ridge A to the eaves. This form of construction is necessary to permit of a proper lapping of the edges of the panes of glass and to form a perfect joint around said parts and to allow of the removal and replacing of a single pane of glass without disturbing the other glass of the roof. Should a pane of glass become broken and it is desired to remove it, the hooked ends *c* of the lock *d* may be unclasped from the rafter and removed, relieving the tension on the tie-strap L, thus loosening the parts, when the broken pane may be replaced with a whole one and the parts again secured, as before described. In like manner a pane of glass secured under the ridge-roll A may be removed by loosening the screw *h* and disengaging the yoke *b'* from the tie-strap L', thus releasing the tension on said strap, permitting the removal and replacing of said glass, said parts being again secured by re-engaging the yoke *b'* with the strap L' and tightening the screw *h*. The reason of the employment of the screw *h* to secure the parts at the ridge instead of the lock *d*, as used on the rafters, is that the parts at the ridge require a greater force to draw them tightly together and maintain a perfect joint than can be exercised by the tension of said spring-lock, while on the rafters the lock is all that is required to secure the glass and adjacent parts together.

From the drawings and foregoing description it will be apparent that the arrangement of parts for securing the glass in the roof is such that said parts may freely expand and contract without danger of breaking said glass, as the glass is not rigidly confined at any point.

Having thus fully set forth my invention, what I claim as new, and desire to secure by Letters Patent, is—

1. In a roof for hot-houses, the combination of the purlin-strip and rafters, the saddle mounted on the purlin, the packing agents on said saddle, the glass, the ridge-roll, the packing interposed between the roll and glass, the tie-strap, and the yoke having the set-screw whereby said parts are detachably coupled, substantially as specified.

2. In combination with the metal purlin and metal rafters, the saddle mounted on said purlin, said saddle having inclined sides, the rubber strips thereon, the glass, the wooden ridge-roll, the rubber agent located between the ridge-roll and the glass, the yoke, the tie-strap passing through the ridge-roll and having engagement with the yoke, the chair, and the set-screw passing through the yoke and engaging with the chair, for the purposes specified.

3. In combination with the purlin and rafter, the saddle mounted on said rafter, the packing agent on said saddle, the glass located thereon, the metal cap, the rubber agent located between said cap and the glass, the tie-strap, the yoke engaged therewith, and spring-lock detachably coupling the parts to the rafter, substantially as set forth.

4. In combination with the metal rafter having the notch *f* in its upper edge, the metal saddle C, the packing agent on said saddle, the glass, the metal cap, the packing-strip located between said cap and the glass, and means, substantially as set forth, for locking said parts detachably to the rafter.

In testimony whereof I affix my signature in presence of two witnesses.

JAMES D. SCOVEL.

Witnesses:
E. S. WHEELER,
B. F. WHEELER.